United States Patent
Lagares Corominas (10) Patent No.: US 8,783,524 B2
(45) Date of Patent: Jul. 22, 2014

(54) VALVE DEVICE FOR A PASTY FOOD PRODUCT VOLUMETRIC METERING APPARATUS, AND VOLUMETRIC METERING APPARATUS

(75) Inventor: Narcis Lagares Corominas, Girona (ES)

(73) Assignee: Metalquimia, S.A. (ES)

( * ) Notice: Subject to any disclaimer, the term of this patent is extended or adjusted under 35 U.S.C. 154(b) by 7 days.

(21) Appl. No.: 13/643,293

(22) PCT Filed: Feb. 25, 2011

(86) PCT No.: PCT/IB2011/000399
§ 371 (c)(1),
(2), (4) Date: Oct. 24, 2012

(87) PCT Pub. No.: WO2011/138644
PCT Pub. Date: Nov. 10, 2011

(65) Prior Publication Data
US 2013/0037579 A1 Feb. 14, 2013

(30) Foreign Application Priority Data
May 5, 2010 (EP) .................. 10380065

(51) Int. Cl.
*B67D 7/60* (2010.01)
(52) U.S. Cl.
USPC ........... 222/387; 222/309; 222/367; 222/380; 222/389
(58) Field of Classification Search
CPC ......... B65B 3/32; G01F 11/021; G01F 15/12; F04B 53/162
USPC ......... 222/367, 368, 373, 380, 389, 309, 387; 251/58, 304, 310; 137/625.47
See application file for complete search history.

(56) References Cited

U.S. PATENT DOCUMENTS

| 1,930,944 A | * | 10/1933 | Schmitz, Jr. ............ 222/48 |
| 2,516,388 A | * | 7/1950 | Humphreys ............ 417/313 |
| 2,613,871 A | * | 10/1952 | Broussard et al. ....... 232/16 |
| 3,650,305 A | * | 3/1972 | Hendershot ............ 141/50 |

(Continued)

FOREIGN PATENT DOCUMENTS

| DE | 675 171 C | 5/1939 | |
| DE | 3206141 A1 | * 9/1983 | ............ G01F 11/04 |
| DE | 4219947 A1 | * 12/1993 | ............ G01F 11/04 |
| EP | 1 090 839 A1 | 4/2011 | |

*Primary Examiner* — Paul R Durand
*Assistant Examiner* — Randall Gruby
(74) *Attorney, Agent, or Firm* — Hess Patent Law Firm LLC; Robert J. Hess (57) ABSTRACT

A valve device for a pasty food product volumetric metering apparatus, and to a volumetric metering apparatus. Both apparatuses have a valve body (1) with a cavity (2) having a first radial opening (3) connected to an inlet conduit (6), a second axial opening (4) connected to a metering chamber (7), and a third radial opening (5) connected to an outlet conduit (8), a plug (9) rotatably arranged inside said cavity (2), and a driver (10, 11) for moving the plug (9) between first and second positions. The plug (9) has an outer surface (12) and an oblique surface (13). In the first position, the oblique surface (13) faces the first and second openings (3, 4) and the outer surface (12) shuts the third opening (5), and in the second position, the oblique surface (13) faces the second and third openings (4, 5) and the outer surface (12) shuts the first opening (3).

13 Claims, 6 Drawing Sheets

(56) References Cited

U.S. PATENT DOCUMENTS

| | | | |
|---|---|---|---|
| 4,146,055 A * | 3/1979 | Ryder et al. | 137/625.41 |
| 4,410,003 A * | 10/1983 | Sandling | 137/312 |
| 4,520,847 A * | 6/1985 | Baron | 137/625.43 |
| 4,617,957 A * | 10/1986 | Sandling | 137/315.26 |
| 4,854,545 A * | 8/1989 | Pezzarossi | 251/310 |
| 5,014,882 A * | 5/1991 | Dennis et al. | 222/309 |
| 5,127,547 A * | 7/1992 | Gerich | 222/55 |
| 5,172,835 A * | 12/1992 | Hudcovic et al. | 222/380 |
| 5,188,149 A * | 2/1993 | Williams | 137/625.47 |
| 5,288,290 A * | 2/1994 | Brody | 604/32 |
| 5,522,430 A * | 6/1996 | Mittersteiner Urzua | 137/625.47 |
| 6,814,109 B2 * | 11/2004 | Rohret et al. | 141/89 |
| 7,621,427 B2 * | 11/2009 | Monti | 222/380 |
| 8,096,451 B2 * | 1/2012 | Monti | 222/452 |
| 8,550,431 B2 * | 10/2013 | Wisser | 251/292 |
| 2004/0154671 A1 * | 8/2004 | Martins et al. | 137/625.47 |
| 2009/0065172 A1 * | 3/2009 | Vacca et al. | 165/41 |
| 2010/0117482 A1 * | 5/2010 | Russberg et al. | 310/306 |

\* cited by examiner

VALVE DEVICE FOR A PASTY FOOD PRODUCT VOLUMETRIC METERING APPARATUS, AND VOLUMETRIC METERING APPARATUS

TECHNICAL FIELD

The present invention relates to a valve device for a pasty food product volumetric metering apparatus applicable, for example, in the meat industry for metering portions of ground meat to be stuffed. The present invention also relates to a pasty food product volumetric metering apparatus including such valve device.

BACKGROUND OF THE INVENTION

Patent EP-A-1090839 describes a volumetric metering apparatus for metering a pasty product applicable to the meat industry, comprising an inlet conduit through which the pasty product is supplied, a metering chamber in which the portions of pasty product are metered, and an outlet conduit through which the metered portions are sent to other apparatuses, such as a stuffing machine or the like for example. The inlet conduit, the metering chamber and the outlet conduit are communicated through a valve device which can adopt a first position to allow a flow of pasty product from the inlet conduit to the metering chamber, and a second position to allow a flow of pasty product from the metering chamber to the outlet conduit.

The valve device has a valve body with a cylindrical cavity having a first radial opening connected to the inlet conduit, a second axial opening connected to the metering chamber, and a third tangential opening connected to the outlet conduit. Inside the cavity of the valve body there is rotatably arranged a valve plug having a cylindrical outer surface and a radial and axial passage forming an elbow therethrough. The valve plug is moved by drive means between a first position, in which the first and second openings are mutually communicated through said radial and axial passage of the valve plug and the third opening is shut by said cylindrical outer surface of the valve plug, and a second position in which the first opening is shut by the cylindrical outer surface of the valve plug and the second and third openings are mutually communicated through the radial and axial passage of the valve plug.

A drawback of this valve device included in the volumetric metering apparatus described in the mentioned patent EP-A-1090839 is that the elbow defined by the radial and axial passage through the valve plug is an obstacle which causes a loss of pressure in the flow of pasty product from the inlet conduit to the metering chamber and from the metering chamber to the outlet conduit.

DISCLOSURE OF THE INVENTION

According to a first aspect, the present invention contributes to solving the previous drawback by providing a valve device for a pasty food product volumetric metering apparatus, comprising a valve body with a cavity of revolution having a first radial or tangential opening connected to an inlet conduit, a second axial opening connected to a metering chamber, and a third radial or tangential opening connected to an outlet conduit, a valve plug rotatably arranged inside said cavity of said valve body, and drive means for moving said valve plug between a first position, in which said first and second openings are mutually communicated and the third opening is shut to allow a flow of pasty food product from said inlet conduit to said metering chamber, and a second position in which the first opening is shut and the second and third openings are mutually communicated to allow a flow of pasty food product from the metering chamber to said outlet conduit.

The mentioned valve plug has an outer revolution surface about an axis of rotation and an oblique surface inclined with respect to said axis of rotation. Said oblique surface is oriented such that it permanently faces the second axial opening of the valve body and alternately faces the first and third radial or tangential openings of the valve body when the valve plug is in said first and second positions, respectively, and at the same time, said outer revolution surface has a plug portion which alternately shuts the third and first radial or tangential openings of the valve body when the valve plug is in the first and second positions, respectively.

With this construction, the oblique wall of the valve plug directs the flow of pasty food product from the inlet conduit to the metering chamber when the valve plug is in the first position and from the metering chamber to the outlet conduit when the valve plug is in the second position without a significant pressure drop occurring in the flow of pasty food product.

In an embodiment, the outer revolution surface of the valve plug is provided by a thin tubular wall surrounding the oblique surface. A window is formed in said thin tubular wall in a position facing the oblique surface, and said window is located in coincidence with the first and third openings of the cavity of the valve body when the valve plug is in the first and second positions, respectively. This thin tubular wall is preferably formed by a tubular body fixed externally to a base body which defines the oblique surface, and said base body is coaxially coupled to a drive shaft operatively connected to be rotated by said drive means, such that the base body and the tubular body rotate together.

The thin tubular wall is thin enough to provide the window of the tubular body with sharp edges capable of cutting the pasty food product when the valve plug rotates with respect to the cavity of the valve body between the first and second positions, and this facilitates the rotation of the valve plug and more precisely demarcates the portions of pasty food product formed by the volumetric metering apparatus.

According to a second aspect, the present invention provides a pasty food product volumetric metering apparatus comprising an inlet conduit, a metering chamber, and an outlet conduit communicated through a valve device according to the first aspect of the present invention. Said valve device comprises a valve body with a cavity having a first opening connected to the inlet conduit, a second opening connected to the metering chamber and a third opening connected to the outlet conduit. Inside the cavity of the valve body there is rotatably installed a valve plug driven such that it can adopt a first position, in which the valve plug allows a flow of pasty food product from said inlet conduit to said metering chamber while at the same time it shuts the outlet conduit, and a second position in which in which the valve plug allows a flow of pasty food product from the metering chamber to said outlet conduit while at the same time it shuts the inlet conduit.

BRIEF DESCRIPTION OF THE DRAWINGS

The foregoing and other features and advantages will be more fully understood from the following detailed description of an embodiment with reference to the attached drawings, in which:

FIG. 7 is a front elevational view of the volumetric metering apparatus of

FIG. 6;

DETAILED DESCRIPTION OF AN EMBODIMENT

Figure 1:
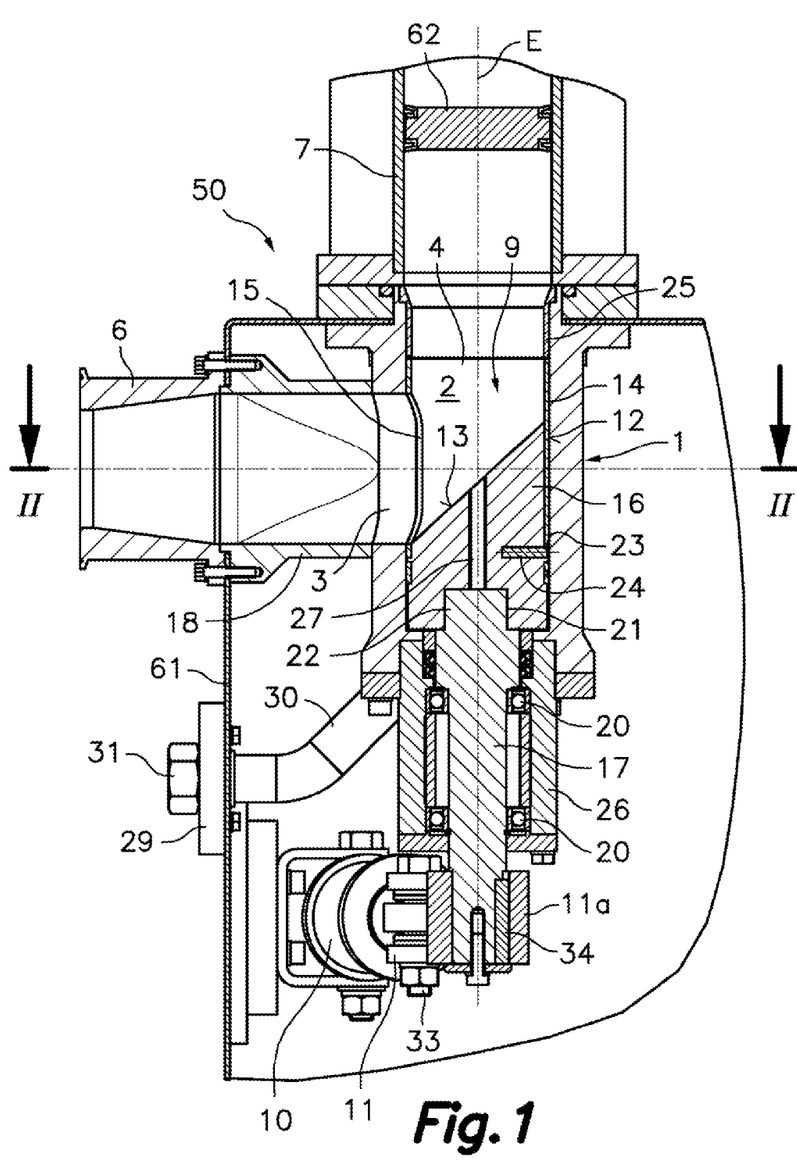
FIG. 1 is a cross-section view taken along plane I-I of FIG. 2, showing a valve device for a pasty food product volumetric metering apparatus according to an embodiment of the first aspect of the present invention with a valve plug in a first position.
Figure 2:
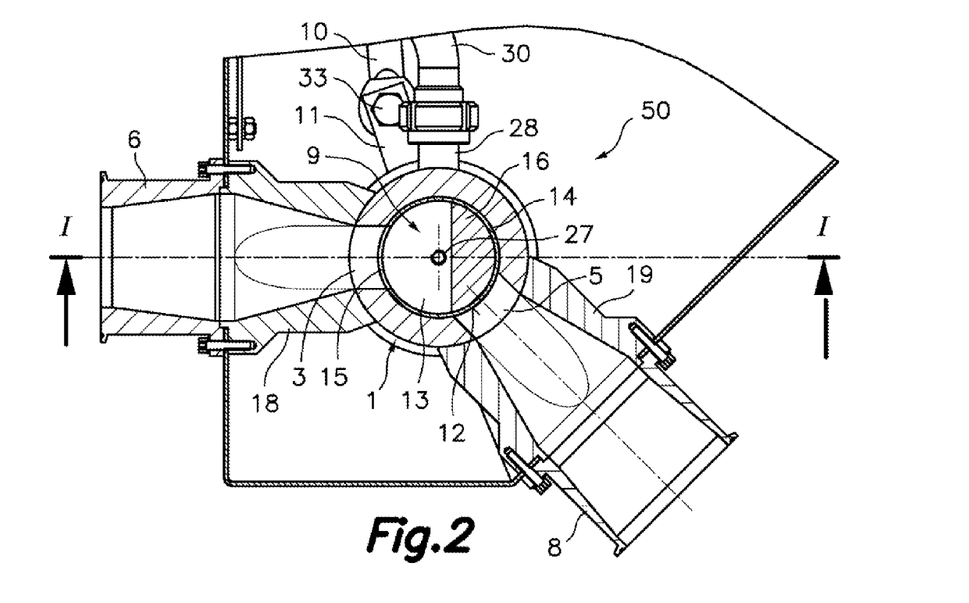
FIG. 2 is a cross-section view taken along plane II-II of FIG. 1.
Figure 3:
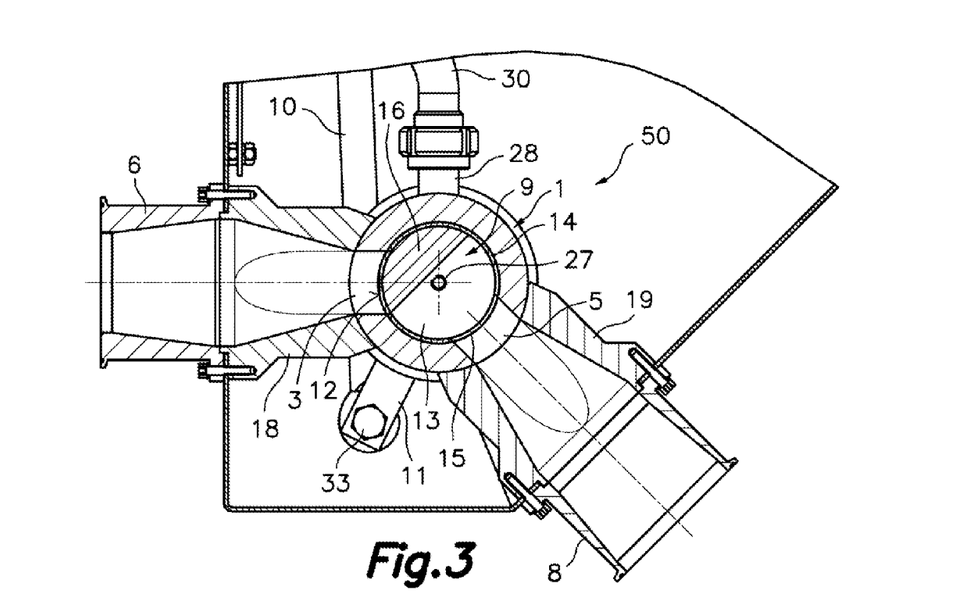
FIG. 3 is a cross-section view similar to FIG. 2, but with the valve plug in a second position.
Figure 6:
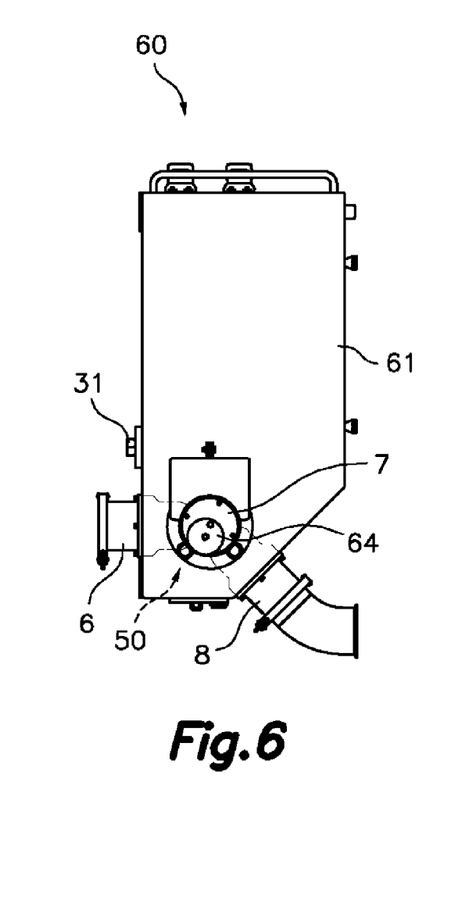
FIG. 6 is a plan view of a pasty food product volumetric metering apparatus according to an embodiment of the second aspect of the present invention.
Figure 7:
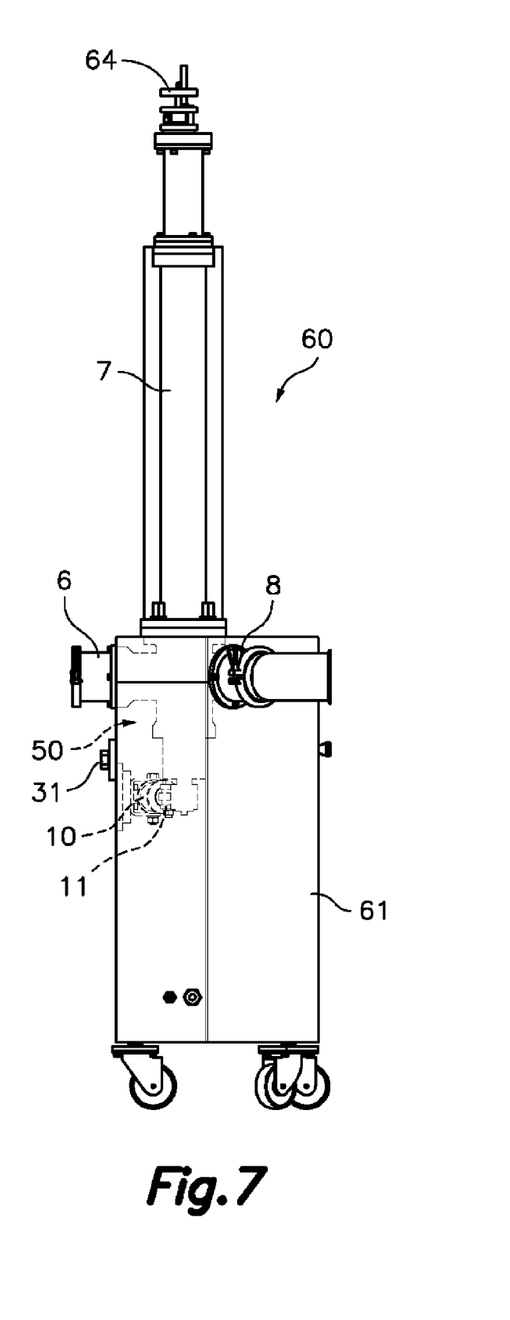
Figure 8:
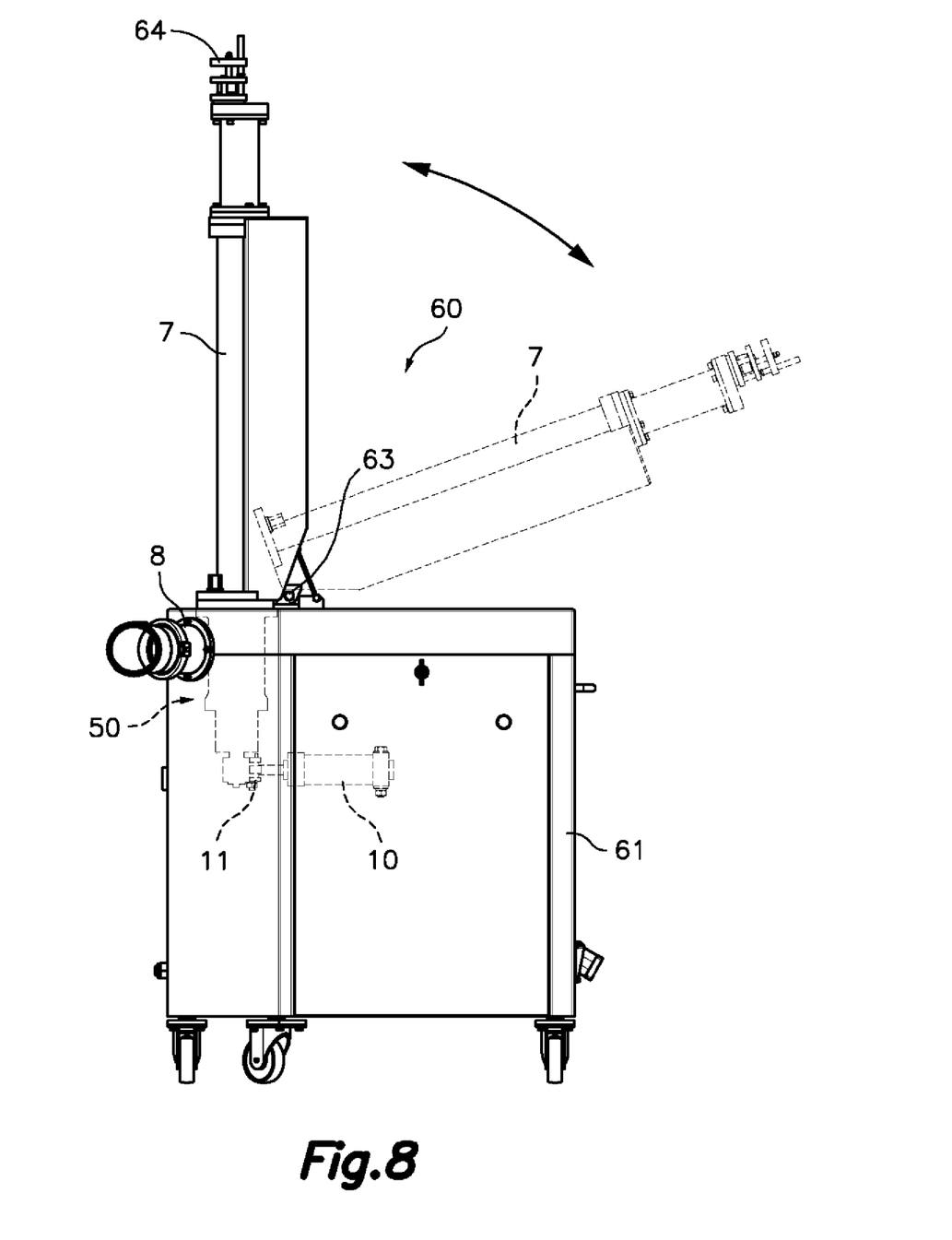
FIG. 8 is a side elevational view of the volumetric metering apparatus.

FIGS. 1, 2 and 3 show a valve device 50 according to an embodiment of the first aspect of the present invention, and FIGS. 6, 7 and 8 show a volumetric metering apparatus 60 for metering a pasty food product according to an embodiment of the second aspect of the present invention, which includes the valve device 50 of FIGS. 1 to 3.

The valve device 50 comprises a valve body 1 having a cavity 2 with a shape of revolution with respect to an axis of rotation E, inside which there is arranged a valve plug 9 such that it can rotate about said axis of rotation E. The cavity 2 of the valve body 1 has a first radial opening 3 connected to an inlet conduit 6, a second axial opening 4 connected to a metering chamber 7, and a third radial opening 5 connected to an outlet conduit 8.

Figure 4:
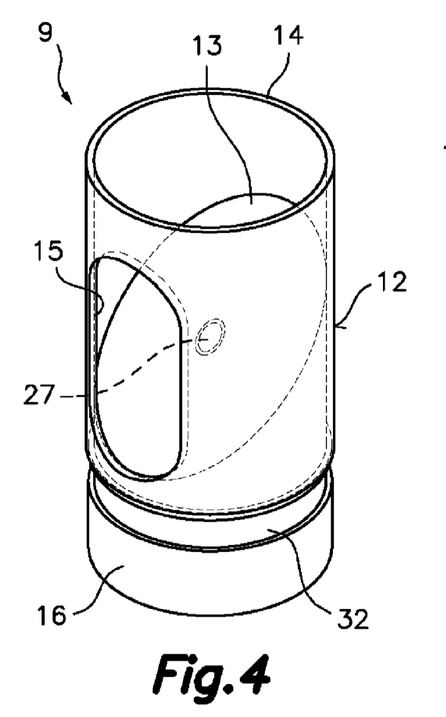
FIG. 4 is a perspective view of the valve plug showing a side thereof.
Figure 5:
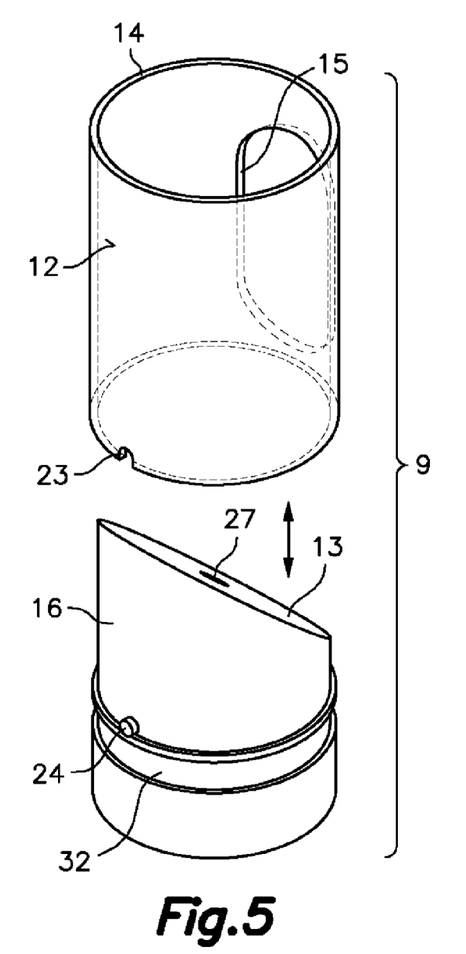
FIG. 5 is an exploded perspective view of the valve plug showing another opposite side thereof.

As is shown more clearly in FIGS. 4 and 5, the valve plug 9 comprises a tubular body which defines a thin tubular wall 14 and a base body 16 which, in the operative situation (FIG. 4), is partially inserted inside said thin tubular wall 14 closing one of its axial ends while the opposite axial end is open. The thin tubular wall 14 has an outer revolution surface 12 and the base body 16 has an oblique surface 13 surrounded by the thin tubular wall 14 and facing the open end of the thin tubular wall 14. A window 15 is formed in the thin tubular wall 14 facing the oblique surface 13. A circumferential channel 32 is formed in a portion of the base body 16 projecting from the closed end of the thin tubular wall 14 for a gasket.

Figure 9:
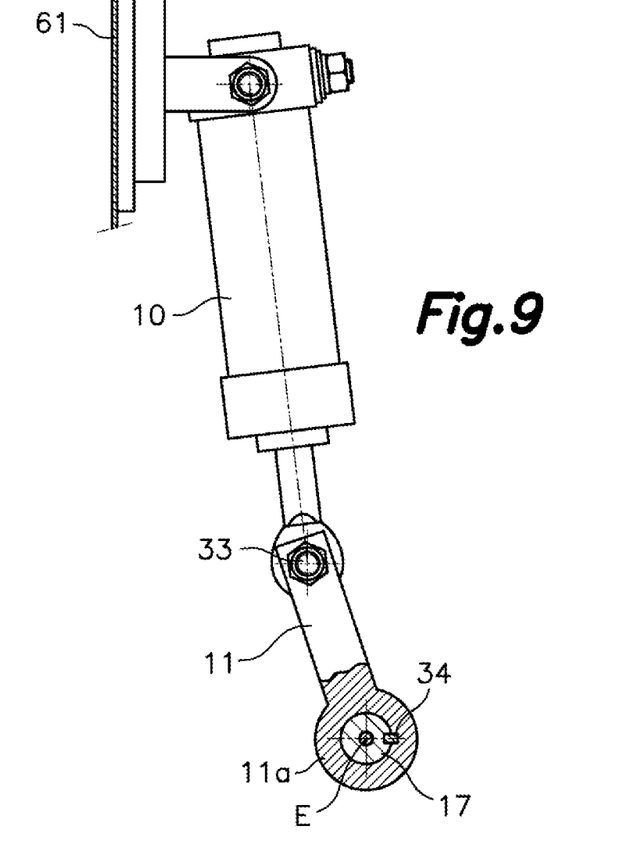
FIG. 9 is a partially sectioned plan view of drive means for moving the valve plug.

In the operative situation, the base body 16 is coaxially coupled to a drive shaft 17 (FIG. 1) operatively connected to be rotated by drive means 10, 11, and said thin tubular wall 14 is operatively connected to rotate together with the base body 16. In the embodiment shown, the mentioned drive means comprise, for example, (see also FIG. 9), a dynamic fluid cylinder 10 connected to a lever 11 fixed to the end of the drive shaft 17, such that the actuation of the dynamic fluid cylinder 10 in opposite directions makes the valve plug 9 rotate about the axis of rotation E alternately between first and second positions. Said lever 11 has at one end a sleeve portion 11a into which the end of the drive shaft 17 is inserted. A key 34 is located between said sleeve portion 11a of the lever 11 and drive shaft 17. The lever 11 is connected at the other end to said dynamic fluid cylinder 10 by an articulation 33.

Whatever the angular position of the valve plug 9 inside the cavity 2 of the valve body 1, the open end of the thin tubular wall 14 will be in coincidence with the second axial opening 4 of the valve body 1 and the oblique surface 13 of the valve plug 9 will be facing this second axial opening 4 of the valve body 1 through the open end of the thin tubular wall 14.

When the valve plug 9 is in the first position (FIGS. 1 and 2), the window 15 of the thin tubular wall 14 of the valve plug 9 is in coincidence with the first radial opening 3 of the cavity 2 of the valve body 1 and the oblique surface 13 of the valve plug 9 faces this first radial opening 3 of the valve body 1 through the window 15, while a plug portion of the outer revolution surface 12 of the thin tubular wall 14 shuts the third radial opening 5 of the cavity 2 of the valve body 1. Thus, in this first position, the valve plug 9 directs a flow of pasty food product from said inlet conduit 6 to said metering chamber 7.

As is conventional, there is a plunger 62 inside the metering chamber 7 which is shifted to move away from the second axial opening 4 of the valve body 1 by the flow of pasty food product entering the metering chamber 7. The shifting of said plunger 62 is limited by an adjustable stop (not shown) which determines the size of the portions metered by the metering chamber 7. The position of the mentioned adjustable stop can be varied from the exterior, for example, by means of a crank 64 (FIGS. 6, 7 and 8). When the plunger 62 is stopped by the adjustable stop, the valve plug 9 is moved to the second position and the plunger is pushed back towards the second axial opening 4 of the valve body 1, for example by means of compressed air injected in the metering chamber 7 in the side of the plunger 62 opposite the pasty food product.

When the valve plug 9 is in the second position (FIG. 3), the window 15 of the thin tubular wall 14 of the valve plug 9 is in coincidence with the third radial opening 5 of the cavity 2 of the valve body 1 and the oblique surface 13 of the valve plug 9 faces this third radial opening 5 of the valve body 1 through the window 15, while said plug portion of the outer revolution surface 12 of the thin tubular wall 14 shuts the first radial opening 3 of the cavity 2 of the valve body 1. Thus, in this second position, the valve plug 9 directs a flow of pasty food product from the metering chamber 7 to said outlet conduit 8.

Furthermore, the thin tubular wall 14 of the valve plug 9 is thin enough to provide the window 15 with sharp edges capable of cutting the pasty food product when the valve plug 9 rotates with respect to the cavity 2 of the valve body 1 between the first and second positions, whereby facilitating the rotation of the valve plug 9 and precisely demarcating the portions metered by the metering chamber 7.

It will be understood that the operation of the valve device is reversible and that the flows of pasty food product could be in the reverse direction, i.e., from the outlet conduit 8 to the metering chamber 7 and from the metering chamber 7 to the inlet conduit 6 without departing from the scope of the present invention.

The first and third radial openings 3, 5 of the cavity 2 of the valve body 1 and the window 15 have all the same shapes and dimensions and are located in one and the same axial position. In the embodiment shown, the first and third openings 3, 5 and the window 15 have an elongated shape in a direction parallel to the axis of rotation E, while the inlet and outlet conduits 6, 8 have a circular section. Accordingly, the first opening 3 is connected to the inlet conduit 6 through a first adapter sleeve 18 having an elongated section in a direction parallel to the axis of rotation E at an end adjacent to the first opening 3 and a circular section at the other end adjacent to the inlet conduit 6 and the third opening 5 is connected to the outlet conduit 8 through a second adapter sleeve 19 having an elongated section in a direction parallel to the axis of rotation E at an end adjacent to the third opening 5 and a circular section at the other end adjacent to the outlet conduit 8.

The mentioned adapter sleeves 18, 19 are attached to the valve body 1, for example by welding or adhesive, and the assembly formed by the valve body and the adapter sleeves 18, 19 is fixed to a structure 61 of the volumetric metering apparatus 60 shown in FIGS. 6, 7 and 8. The drive shaft 17 is guided to rotate with respect to the valve body 1 about the axis of rotation E by bearings 20 (FIG. 1), which are supported in a bearing support sleeve 26 fixed to the valve body 1.

As is shown in FIG. 8, the metering chamber 7 can be pivoted with respect to a horizontal shaft 63 between a work position represented by means of solid lines and a maintenance position represented by means of dotted lines, in which the second axial opening 4 of the cavity 2 of the valve body 1 is accessible. When the metering chamber 7 is in said maintenance position, the base body 16 of the valve plug 9 can be axially introduced in the cavity 2 of the valve body 1 through the second axial opening 4. The base body 16 is coupled to the drive shaft 17 by means of an axial fitting of respective first conjugated coupling elements 21, 22.

In the embodiment shown, these first conjugated coupling elements comprise a non-circular recess 21, for example a square or hexagonal recess, formed in an axial surface of the base body 16 opposite the oblique surface 13 and a conjugated non-circular projection 22 formed at an end of the drive shaft 17, although the non-circular recess could alternatively be formed in the drive shaft 17 and the projection in the base body 16.

When the base body 16 is coupled to the drive shaft 17, the thin tubular wall 14 of the valve plug 9 can be axially introduced in the cavity 2 of the valve body 1 through the second axial opening 4, until the thin tubular wall 14 is coupled to the base body 16 by means of an axial fitting of respective second conjugated coupling elements 23, 24. In the embodiment shown, these second conjugated coupling elements comprise a notch 23 (FIGS. 1 and 5) formed in a lower edge of the thin tubular wall 14, which fits in a protruding portion of a bolt 24 inserted in a radial hole formed in the base body 16. The coupling of the mentioned notch 23 and the bolt 24 assures that the thin revolution wall 14 in the operative situation is in the suitable angular position in relation to the base body 16 and that the thin tubluar wall 14 rotates together with the base body 16.

When the thin tubular wall 14 and the base body 16 are mutually coupled in the operative situation, the thin tubular wall 14 is retained against movements in the axial direction but with the possibility of rotating about the axis of rotation E inside the cavity 2 of the valve body 1 by a ring 25 inserted through the second axial opening 4 and housed therein. In turn, the mentioned ring 25 is retained in position by the metering chamber 7 when the latter is pivoted and fixed in the work position (FIG. 1).

The elements of the valve plug 9 can be easily disassembled by means of a reverse sequence of operations. First, the metering chamber 7 will be pivoted to the maintenance position and then the ring 25, the thin tubular wall 14 and the base body 16 will be extracted. To facilitate gripping of the latter, the base body 16 has an axial threaded hole 27 formed therein, in which a threaded pin of an extractor (not shown) introduced through the second axial opening 4 can be coupled.

The valve body 1, the first and second adapter sleeves 18, 19, as well as the thin tubular wall 14 and the base body 16 of the valve plug 9 are preferably made of stainless steel, although other materials are not ruled out. The cavity 2 of the valve body 1 optionally has in a lower region a drain outlet 28 (FIGS. 2 and 3) connected to a draining port 29 (FIG. 1) through a drain conduit 30. The draining port 29 is externally supported in the structure 61 of the volumetric metering apparatus 60 and has a removable closure cap 31.

In an alternative embodiment (not shown), the valve plug 9 only has the base body 16 with an outer revolution surface about the axis of rotation E and an oblique surface 13 inclined with respect to said axis of rotation E, and does not have the thin tubular wall 14 with the window 15. In such case, when the valve plug 9 is in the operative situation, the oblique surface 13 permanently faces the second axial opening 4. When the valve plug 9 is in the first position the oblique surface 13 faces the first radial opening 3 while a plug portion of said outer revolution surface shuts the third radial opening 5, and when the valve plug 9 is in the second position, the oblique surface 13 faces the second radial opening 5 while said plug portion of the outer revolution surface shuts the first radial opening 3.

FIGS. 6, 7 and 8 show a volumetric metering apparatus 60 according to the second aspect of the present invention, which is useful for metering pasty food product. The volumetric metering apparatus 60 comprises a structure 61 which supports an inlet conduit 6, a metering chamber 7, and an outlet conduit 8, which are communicated through the valve device 50 according to the first aspect of the present invention described above. The valve device 50 can adopt a first position to direct a flow of pasty food product from said inlet conduit 6 to said metering chamber 7 while the outlet conduit 8 is shut, and a second position to direct a flow of pasty food product from the metering chamber 7 to said outlet conduit 8 while the inlet conduit 6 is shut.

As is shown in FIG. 8, for cleaning, maintenance and repair operations, the metering chamber 8 can pivot with respect to a horizontal shaft 63 between a work position represented by means of solid lines and a maintenance position represented by means of dotted lines, which facilitates access to the cavity of the valve body 1 and allows an easy installation and removal of the elements forming the valve plug 9 as it has been described above.

A person skilled in the art will consider modifications and variations based on the embodiments shown and described without departing from the scope of the present invention as it is defined in the following claims.

The invention claimed is:

1. A valve device for a pasty food product volumetric metering apparatus, comprising: a valve body with a cavity of revolution having a first radial or tangential opening connected to an inlet conduit, a second axial opening connected to a metering chamber, and a third radial or tangential opening connected to an outlet conduit; a valve plug rotatably arranged inside said cavity of said valve body; and a dynamic fluid cylinder that moves said valve plug between a first position, in which said first and second openings are mutually communicated and the third opening is shut to allow a flow of pasty food product from said inlet conduit to said metering chamber, and a second position in which the first opening is shut and the second and third openings are mutually communicated to allow a flow of pasty food product from the metering chamber to said outlet conduit, wherein:

said valve plug has an outer revolution surface about an axis of rotation and an oblique surface inclined with respect to said axis of rotation, where said oblique surface permanently faces the second axial opening and alternately faces the first and third radial or tangential openings when the valve plug is in said first and second positions, respectively, while a plug portion of said outer revolution surface alternately shuts the third and first openings when the valve plug is in the first and second positions, respectively; the outer revolution surface of the valve plug is provided by a thin tubular wall inside which the oblique surface is located, a window being formed in said thin tubular wall facing the oblique surface, said window being located in coincidence with the first and third openings of the cavity of the valve body in the first and second positions, respectively; and wherein the thin tubular wall is thin enough to provide the window with sharp edges capable of cutting the pasty food product when the valve plug rotates with respect to the cavity of the valve body.

2. The valve device according to claim 1, wherein the oblique surface of the valve plug is provided by a base body coaxially coupled to a drive shaft operatively connected to be rotated by said dynamic fluid cylinder, and said thin tubular wall is operatively connected to rotate together with said base body.

3. The valve device according to claim 2, wherein said drive shaft is guided to rotate with respect to the valve body by bearings, and the base body of the valve plug is coupled to the drive shaft by means of an axial fitting of respective first conjugated coupling elements (21, 22).

4. The valve device according to claim 3, wherein the thin tubular wall of the valve plug is coupled to the base body by means of mutual fitting of respective second conjugated coupling elements when the thin tubular wall and the base body perform a relative movement in an axial direction.

5. The valve device according to claim 4, wherein the thin tubular wall is retained with the possibility of rotating inside the cavity of the valve body by a ring housed in the second axial opening.

6. The valve device according to claim 4, wherein said first conjugated coupling elements comprise a non-circular recess formed in an axial surface of the base body opposite the oblique surface and a conjugated non-circular projection formed at an end of the drive shaft.

7. The valve device according to claim 4, wherein said second coupling conjugated elements comprise a notch formed in an axial edge of the thin tubular wall and a protruding portion of a bolt inserted in a radial hole of the base body.

8. The valve device according to claim 1, wherein the first and third openings are located in a same axial position, the window is located in the tubular thin wall in a same position in an axial direction as the first opening and the third opening, and the first opening, the third opening and the window each have substantially same shape and same dimensions.

9. The valve device according to claim 8, wherein the first and third openings and the window are elongated in a direction parallel to the axis of rotation.

10. The valve device according to claim 9, wherein the first opening is connected to the inlet conduit through an adapter sleeve having an elongated section in a direction parallel to the axis of rotation at an end adjacent to the first opening and a circular section at the other end adjacent to the inlet conduit.

11. The valve device according to claim 9, wherein the third opening is connected to the outlet conduit through an adapter sleeve having an elongated section in a direction parallel to the axis of rotation at an end adjacent to the third opening and a circular section at the other end adjacent to the outlet conduit.

12. The valve device according to claim 1, wherein the thin tubular wall and the base body are made of stainless steel.

13. A pasty food product volumetric metering apparatus comprising an inlet conduit, a metering chamber, and an outlet conduit communicated through a valve device which can adopt a first position to direct a flow of pasty food product from said inlet conduit to said metering chamber, and a second position to direct a flow of pasty food product from the metering chamber to said outlet conduit, said valve device comprising: a valve body with a cavity of revolution having a first radial or tangential opening connected to an inlet conduit, a second axial opening connected to a metering chamber, and a third radial or tangential opening connected to an outlet conduit; a valve plug rotatably arranged inside said cavity of said valve body; and a dynamic fluid cylinder that moves said valve plug between a first position, in which said first and second openings are mutually communicated and the third opening is shut to allow a flow of pasty food product from said inlet conduit to said metering chamber, and a second position in which the first opening is shut and the second and third openings are mutually communicated to allow a flow of pasty food product from the metering chamber to said outlet conduit, wherein: said valve plug has an outer revolution surface about an axis of rotation and an oblique surface inclined with respect to said axis of rotation, where said oblique surface permanently faces the second axial opening and alternately faces the first and third radial or tangential openings when the valve plug is in said first and second positions, respectively, while a plug portion of said outer revolution surface alternately shuts the third and first openings (5, 3) when the valve plug is in the first and second positions, respectively; the outer revolution surface of the valve plug is provided by a thin tubular wall inside which the oblique surface is located, a window being formed in said thin tubular wall facing the oblique surface, said window being located in coincidence with the first and third openings of the cavity of the valve body in the first and second positions, respectively; and wherein the thin tubular wall is thin enough to provide the window with sharp edges capable of cutting the pasty food product when the valve plug rotates with respect to the cavity of the valve body.

* * * * *